(12) United States Patent
Robarge (10) Patent No.: US 10,059,394 B2
(45) Date of Patent: Aug. 28, 2018

(54) ALL-TERRAIN VEHICLE TRAILER

(71) Applicant: Michael P. Robarge, Venice, FL (US)

(72) Inventor: Michael P. Robarge, Venice, FL (US)

(*) Notice: Subject to any disclaimer, the term of this patent is extended or adjusted under 35 U.S.C. 154(b) by 60 days.

(21) Appl. No.: 15/250,142

(22) Filed: Aug. 29, 2016

(65) Prior Publication Data

US 2018/0056740 A1    Mar. 1, 2018

(51) Int. Cl.
| | |
|---|---|
| *B62D 63/00* | (2006.01) |
| *B62D 61/00* | (2006.01) |
| *B60D 1/58* | (2006.01) |
| *B60R 9/06* | (2006.01) |
| *B60D 1/00* | (2006.01) |

(52) U.S. Cl.
CPC ............. *B62D 61/00* (2013.01); *B60D 1/58* (2013.01); *B60R 9/06* (2013.01); *B60D 2001/005* (2013.01)

(58) Field of Classification Search
CPC .... B60D 1/54; B60D 1/155; B60D 2001/544; B62D 61/00
USPC ........................................................ 280/401
See application file for complete search history.

(56) References Cited

U.S. PATENT DOCUMENTS

| | | | | |
|---|---|---|---|---|
| 4,645,230 A * | 2/1987 | Hammons | ............ | B62D 63/061 16/20 |
| 4,648,617 A * | 3/1987 | Hannappel | ........... | B62D 63/065 280/304.3 |
| 5,373,978 A * | 12/1994 | Buttchen | ................... | B60R 9/06 224/510 |
| 6,062,451 A * | 5/2000 | Lassanske | ................ | B60R 9/06 224/502 |
| 6,254,117 B1 * | 7/2001 | Cross | ..................... | B60D 1/155 280/401 |
| 6,461,095 B1 * | 10/2002 | Puska | ........................ | B66F 9/06 224/401 |
| 7,229,090 B2 * | 6/2007 | Cumbie | ................... | B60D 1/00 280/491.3 |
| 7,770,913 B2 * | 8/2010 | Cannon | ................ | B62D 63/061 280/278 |
| 8,474,561 B2 * | 7/2013 | Allingham | ................ | B60R 9/06 180/89.11 |
| 2004/0032114 A1 * | 2/2004 | Hagen | .................. | B62D 63/061 280/656 |
| 2008/0157493 A1 * | 7/2008 | McConkey | .......... | B62D 63/061 280/40 |
| 2009/0289438 A1 * | 11/2009 | Waddell | ............... | B62D 63/061 280/401 |
| 2016/0200157 A1 * | 7/2016 | Marmon | .................. | B60D 1/58 280/491.3 |

* cited by examiner

*Primary Examiner* — Jacob D Knutson (74) *Attorney, Agent, or Firm* — Dunlap Bennett & Ludwig PLLC (57) ABSTRACT

An all-terrain vehicle (ATV) trailer is provided. The ATV trailer includes an ATV mount operable to secure to a rear end of an ATV/UTV. The ATV trailer further includes a trailer frame having a platform. The trailer frame is pivotally secured to the ATV mount. At least one wheel is secured to a bottom surface of the trailer frame. A locking mechanism is operable to lock the trailer frame in a retracted position and a deployed position. The retracted position includes the trailer frame substantially vertical and pivoted towards the ATV and the deployed position includes the trailer frame substantially horizontal and pivoted away from the ATV.

9 Claims, 8 Drawing Sheets

ALL-TERRAIN VEHICLE TRAILER

BACKGROUND OF THE INVENTION

The present invention relates to all-terrain vehicles and, more particularly, to a trailer made for all-terrain vehicles.

An all-terrain vehicle (ATV) is a vehicle that travels on low-pressure tires, with a seat that is straddled by the operator, along with handlebars for steering control. Utility-terrain vehicle (UTV) has bucket or bench seats and a steering wheel. As the name implies, it is designed to handle a wider variety of terrain than most other vehicles. Many utility ATVs or UTVs may include a rack for transportation of materials. However, racks are usually small and do not provide enough hauling space.

The majority of the trailers currently on the market do not fit most ATV/UTVs. Further, current trailers usually include two wheels and require the user to remove it with each use when the ATV/UTV needs to be used alone without the trailer attachment. The maneuverability is cumbersome when backing up and most have limited payload capacity.

As can be seen, there is a need for an improved trailer that secures to a rear end of an ATV.

SUMMARY OF THE INVENTION

In one aspect of the present invention, an all-terrain vehicle (ATV) trailer comprises: an ATV mount operable to secure to a rear end of an ATV; a trailer frame comprising a platform, wherein the trailer frame is pivotally secured to the ATV mount; at least one wheel secured to a bottom surface of the trailer frame; and a locking mechanism operable to lock the trailer frame in a retracted position and a deployed position, wherein the retracted position comprises the trailer frame substantially vertical and pivoted towards the ATV and the deployed position comprises the trailer frame substantially horizontal and pivoted away from the ATV.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes an ATV/UTV fifth wheel backpack with a duel mounting system. The present invention assists in hauling heavy items, such as hay, gardening, farming, hunting equipment, fishing gear, and other outdoor activities. The present invention improves the versatility of using an ATV/UTV to enhance the carrying capacity which allows the user to carry 300 lbs or more of payload. The dual mounting system allows the device to be mounted to any ATV/UTV. Further, the dual system folds up and is compact when not in use and does not have to be removed from the ATV/UTV, allowing the user to use the ATV/UTV with the system still attached and always available when needed.

Figure 1:
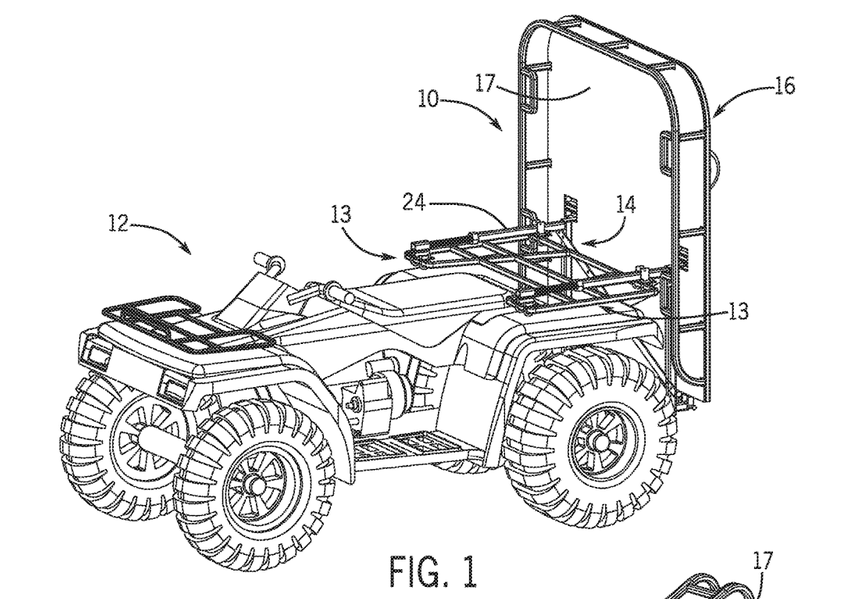
FIG. 1 is a front perspective view of an embodiment of the present invention in a retracted position mounted on an ATV/UTV.
Figure 2:
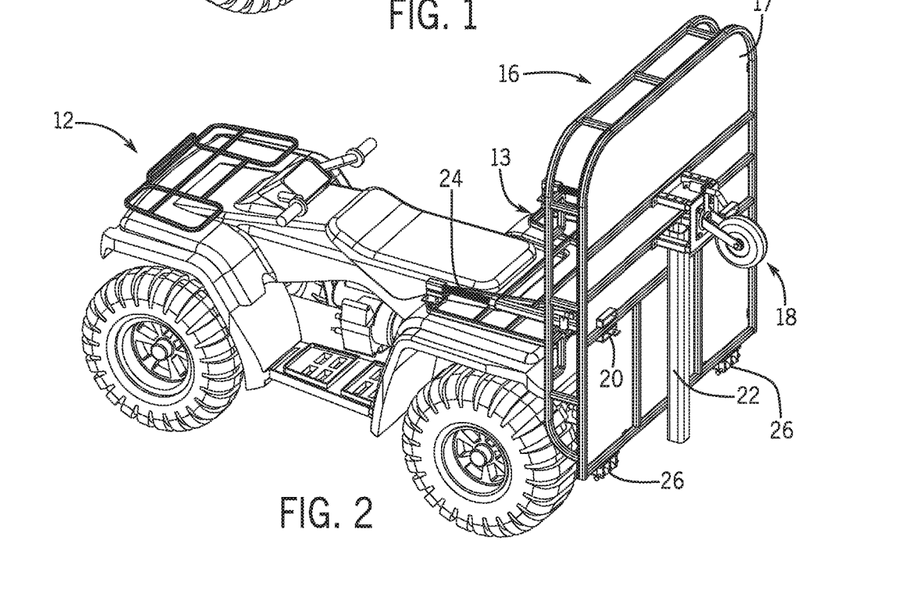
FIG. 2 is a rear perspective view of an embodiment of the present invention in a retracted position mounted on an ATV/UTV.
Figure 3:
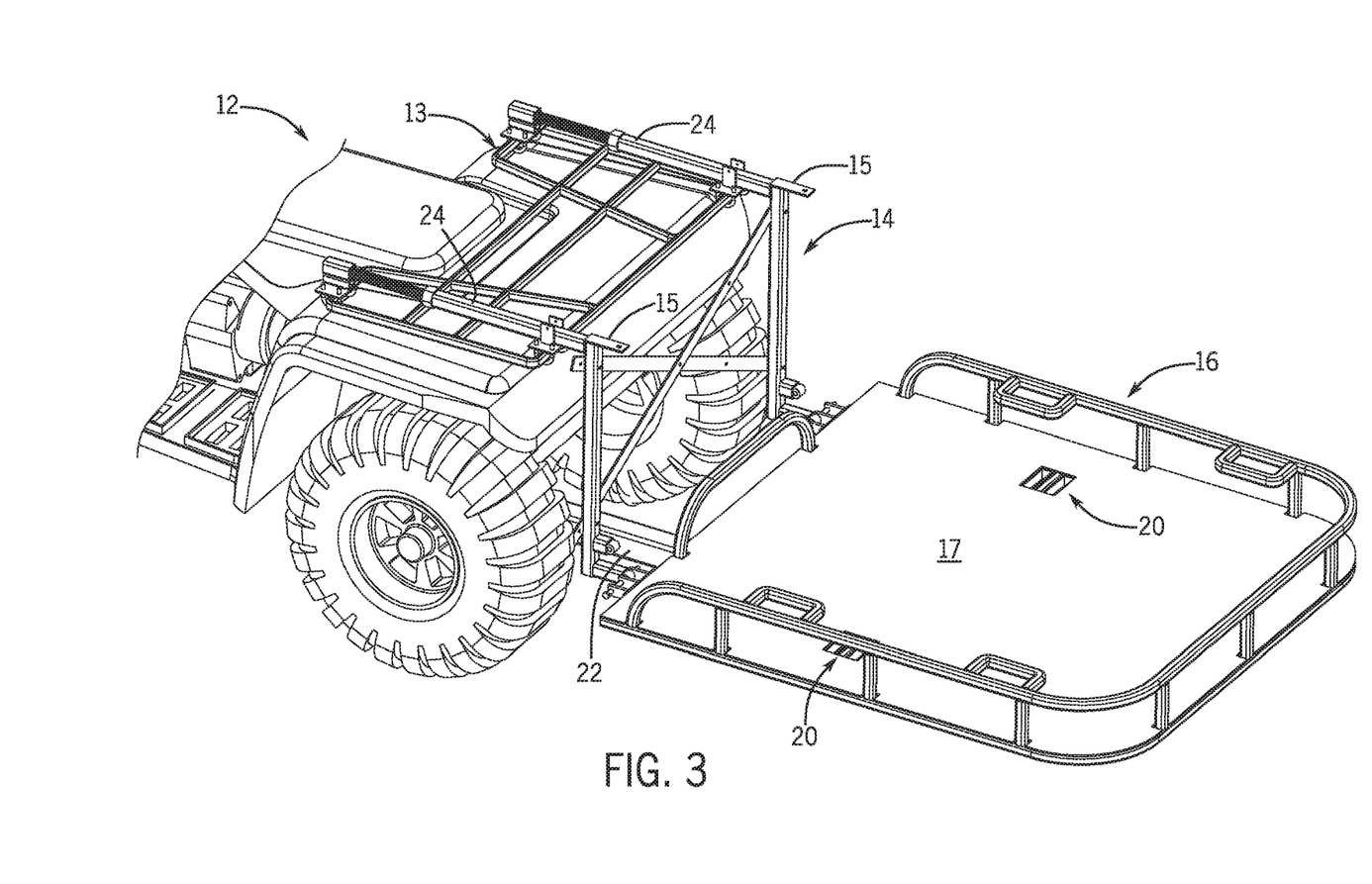
FIG. 3 is a perspective view of an embodiment of the present invention in a deployed position mounted on an ATV/UTV.
Figure 4:
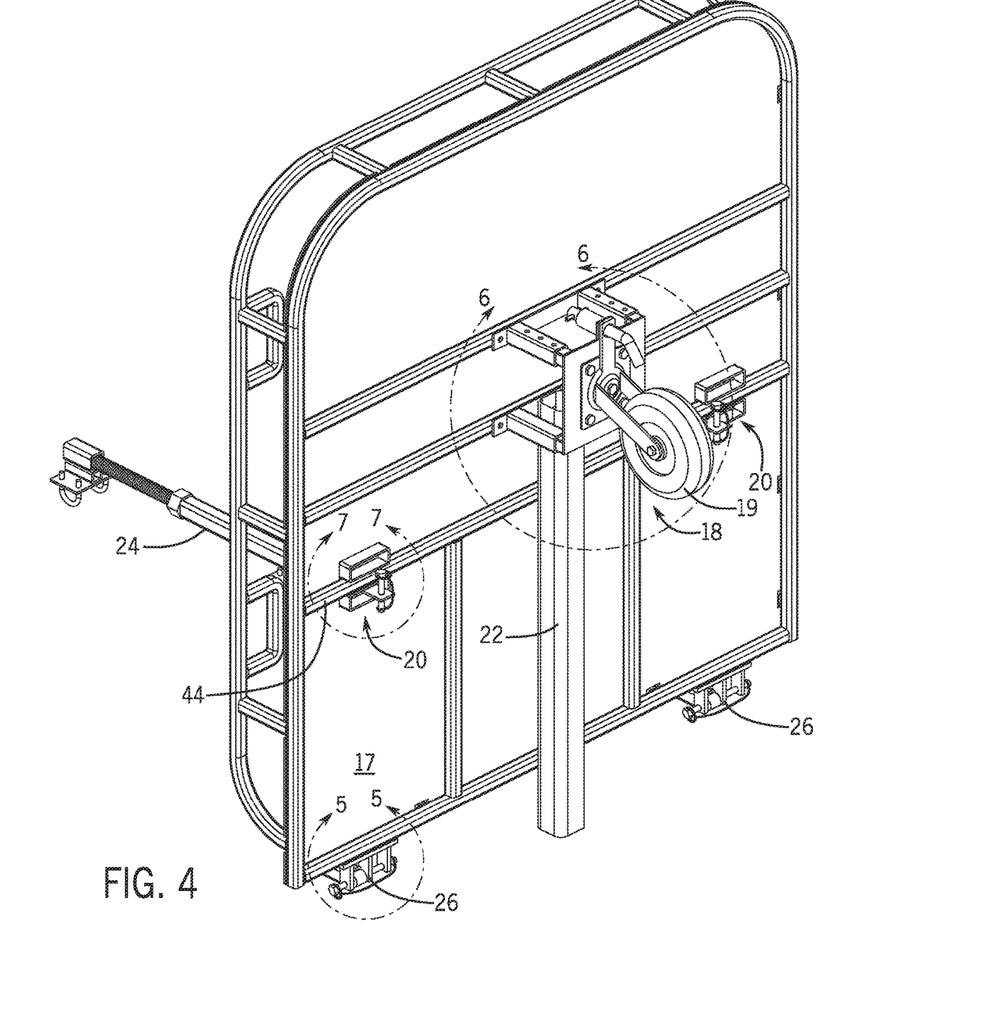
FIG. 4 is a rear perspective view of an embodiment of the present invention in a retracted position.
Figure 5:
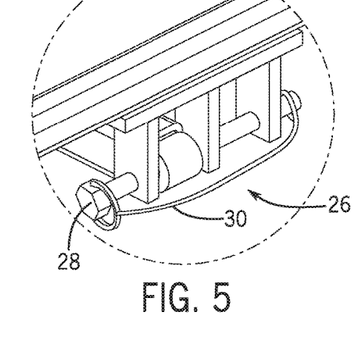
FIG. 5 is a detail perspective view of line 5-5 of FIG. 4.
Figure 6:
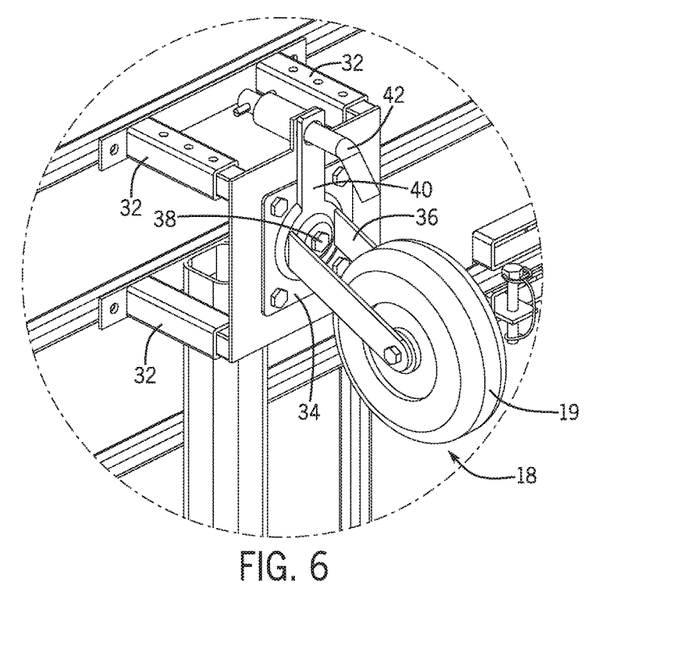
FIG. 6 is a detail perspective view of line 6-6 of FIG. 4.
Figure 7:
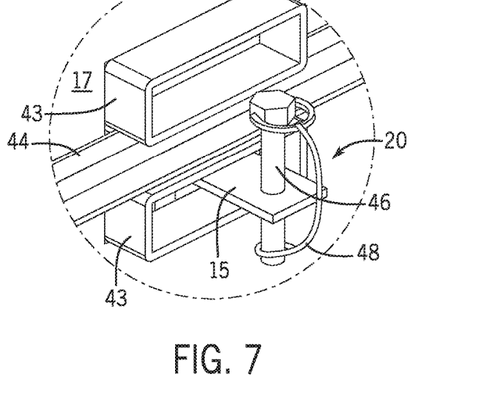
FIG. 7 is a detail perspective view of line 7-7 of FIG. 4.
Figure 8:
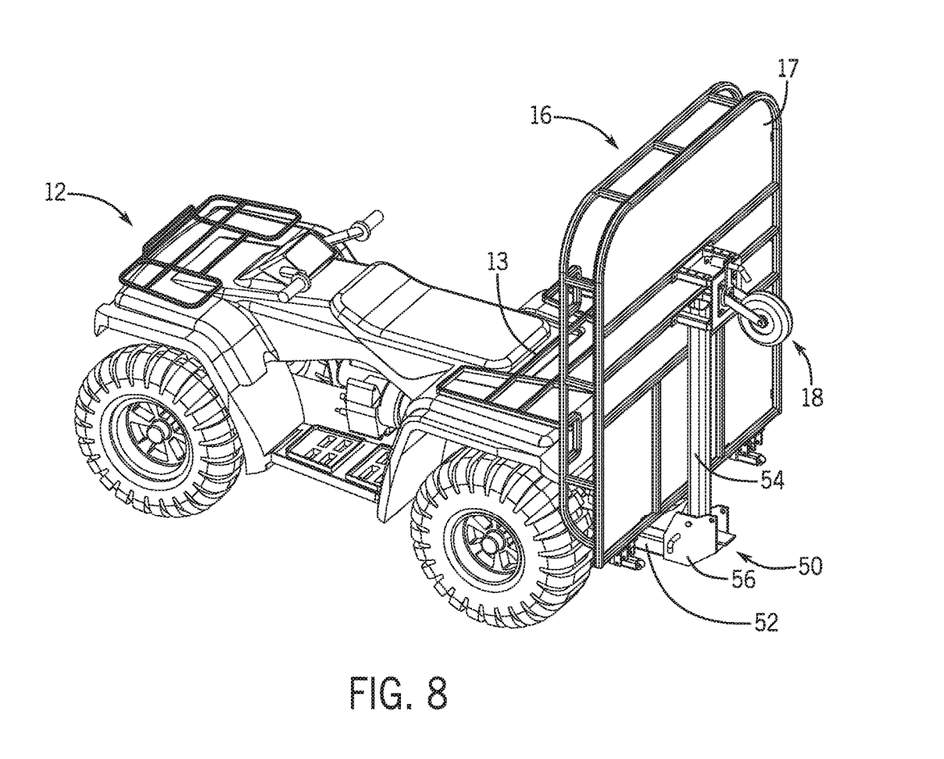
FIG. 8 is a rear perspective view of an embodiment of the present invention in a retracted position mounted on an ATV/UTV.
Figure 9:
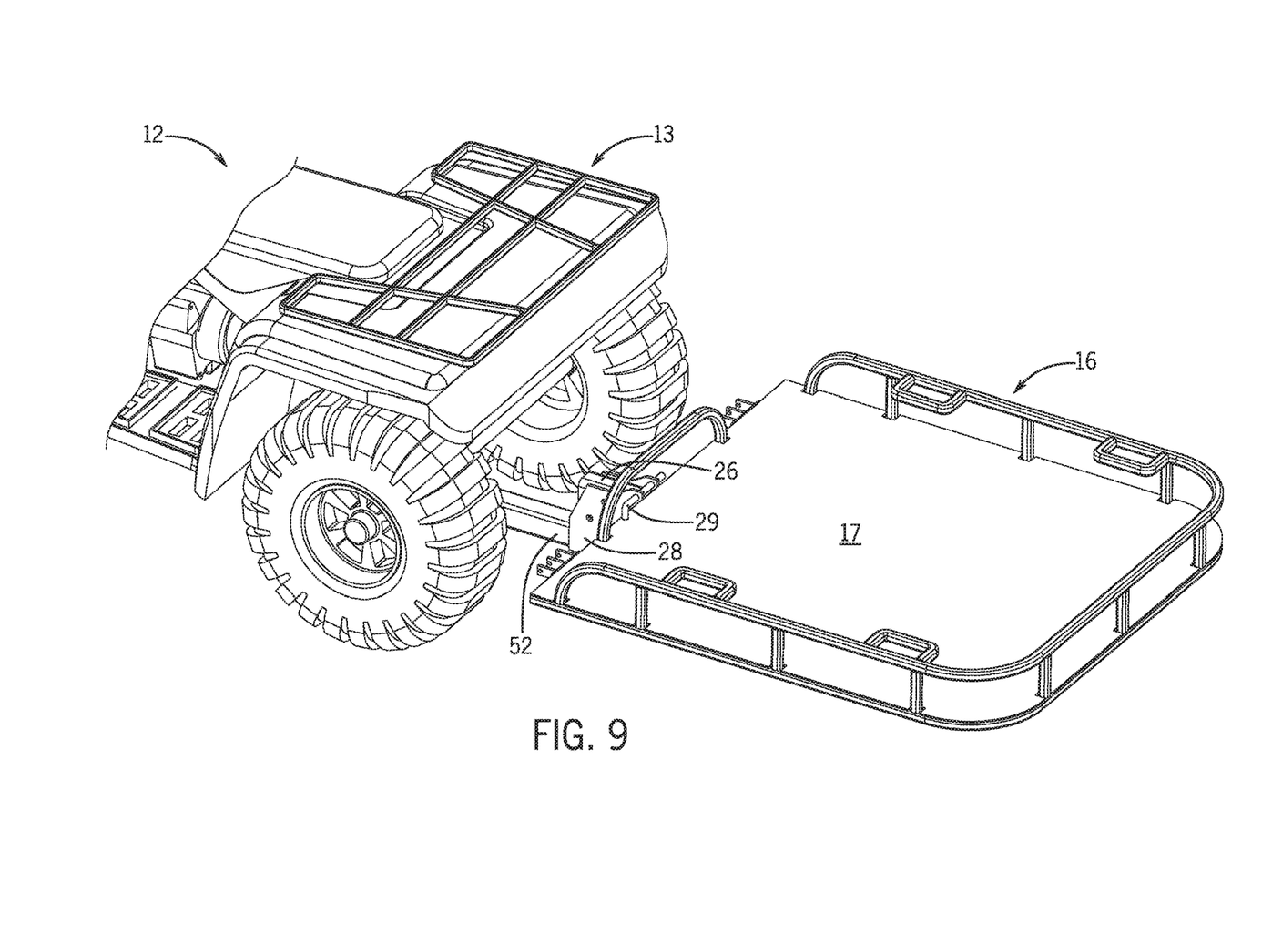
FIG. 9 is a perspective view of an embodiment of the present invention in a deployed position mounted on an ATV/UTV.
Figure 10:
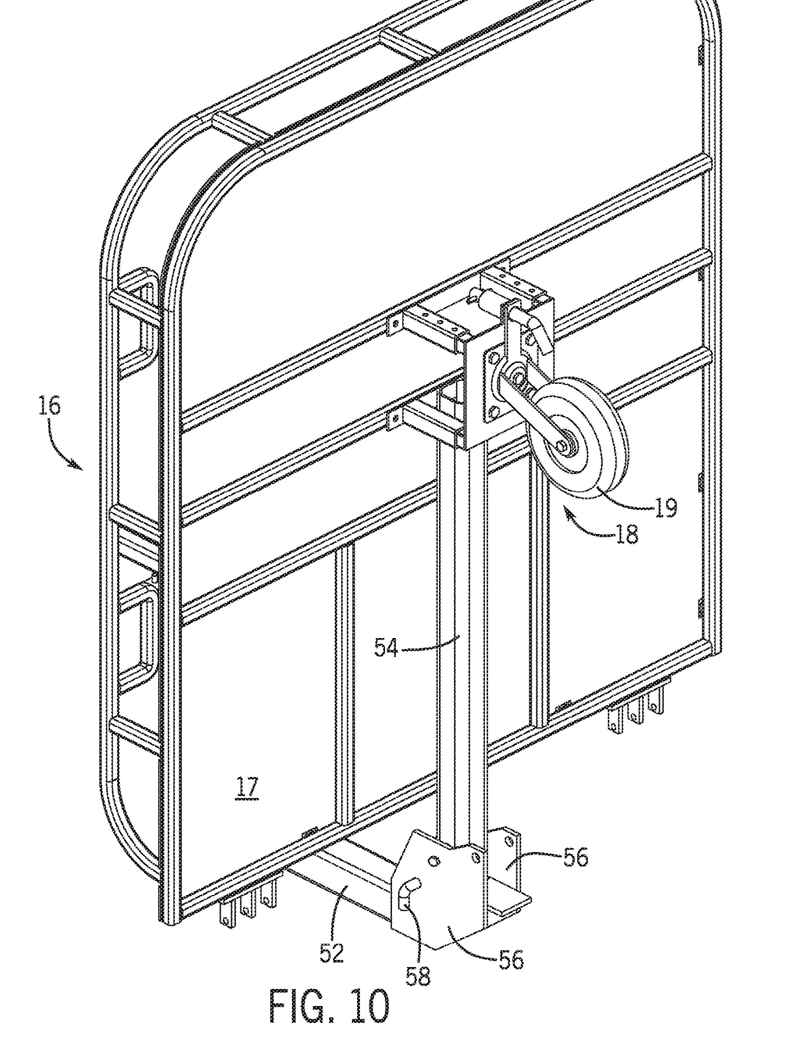
FIG. 10 is a perspective view of an embodiment of the present invention in a retracted position.
Figure 11:
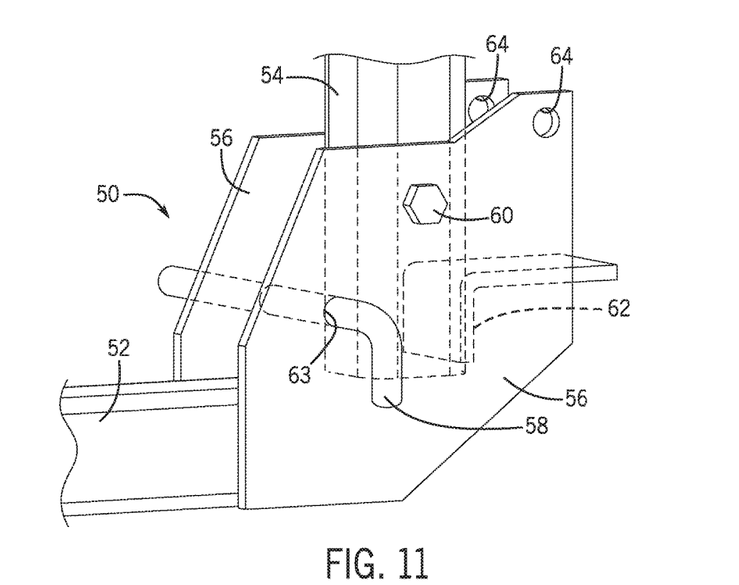
FIG. 11 an exploded detail perspective view of an embodiment of the present invention in a retracted position.
Figure 12:
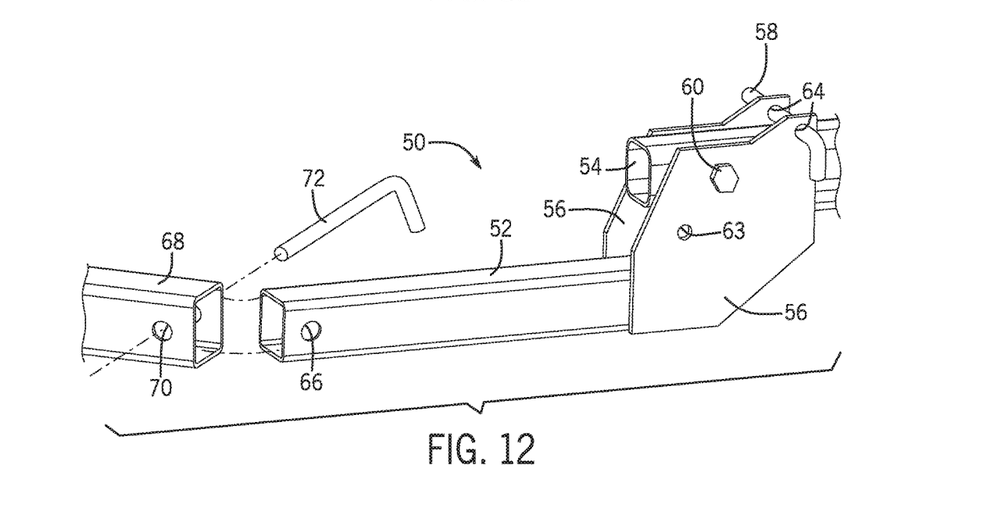
FIG. 12 is an exploded detail perspective view of an embodiment of the present invention in a deployed position.

Referring to FIGS. 1 through 12, the present invention includes an all-terrain vehicle (ATV) trailer 16. The ATV trailer 16 includes an ATV mount operable to secure to a rear end of an ATV 12. The ATV trailer 16 further includes a trailer frame 44 having a platform 17. The platform may include sidewalls and rounded corners. The floor of the platform is made of expanded metal which makes the platform lightweight. The trailer frame 44 is pivotally secured to the ATV mount. At least one wheel 19 is secured to a bottom surface of the trailer frame 44. A locking mechanism is operable to lock the trailer frame 44 in a retracted position and a deployed position. The retracted position includes the trailer frame 44 substantially vertical and pivoted towards the ATV 12 and the deployed position includes the trailer frame 44 substantially horizontal and pivoted away from the ATV 12.

The present invention may utilize a single wheel secured to a central bottom portion of the trailer frame 44. The wheel 19 of the present invention may be secured to the bottom surface by a wheel assembly 18. The wheel assembly 18 includes legs 32 including a first end secured to the frame 44 and a second end secured to a base plate 34. The legs 32 may be adjustable in length to adjust to different sized ATVs 12. For example, each leg 42 may include telescoping tubes with aligning apertures and a pin that fits within the aligned apertures at different lengths. A yoke 36 may be pivotally secured to the base plate by a pivot pin 38 along a vertical axis when the ATV trailer 16 is in the deployed position. The wheel 19 may be pivotally secured within the yoke 36 along a horizontal axis. Therefore, the wheel 19 may pivot about a vertical and horizontal axis, and thereby may swivel. The wheel assembly 18 may further include a wheel lock. A tongue 40 extends laterally from the yoke 36. An aperture formed through the tongue 40 aligns with an aperture formed through the base plate 34. A locking pin 42 fits through the aligning apertures, preventing the wheel assembly 18 from pivoting along the vertical axis.

FIGS. 1 through 7 illustrates a first embodiment 10 of the present invention. The ATV mount includes horizontal mounts 24 secured to the rack 13 by clamps or U-bolts and vertical mounts 14 extending downward from distal ends of the horizontal mounts 24. The horizontal mounts 24 may be adjustable in length to adjust to different sized ATVs 12. For example, the horizontal mounts 24 may include telescoping tubes with aligning apertures and a pin or the horizontal mounts 24 may include threaded mating tubes. The top ends of the vertical mounts 14 may each include a latch 15 extending therefrom. A cross frame may secure the vertical mounts 14 together to add structural integrity. The bottom ends of the vertical mounts 14 may pivotally secure to the frame 44 by a pivotal attachment 26 including a pivot pin 28 and a bale 30. A structural tube 22 may be secured to a bottom portion of the trailer frame 44. The structure tube allows the present invention to be installed on to the hitch of on any ATV/UTV as explained below.

In such embodiments, the platform 17 may include latch receivers 20. Slots 43 are formed within the latch receivers 20. When transforming the present invention from the deployed position to the retracted position, the user may pivot the frame 44 upward towards the ATV 12. The latches 15 of the vertical mounts 14 are inserted through the slots 43 of the latch receiver 20. The distal ends of the latches 15 may each include an aperture. A pin 46 may fit through each aperture and a bale 48 prevents the pin 46 from escaping the apertures. The pin 46 and bale 48 thereby lock the frame 44 in the retracted position.

FIGS. 8 through 12 illustrate a second embodiment 50 of the present invention. The ATV mount may include a mount tube 52. The mount tube 52 includes an aperture 66 that aligns with an aperture 70 formed through a trailer receiver 68 of an ATV 12. A pin 72 fits within the aligned apertures 66, 70 and locks the mount tube 52 to the receiver 68. Side plates 56 may be secured to a distal end of the mount tube 52. A pivoting tube 54 may be pivotally connected to the side plates 56 by a pivot pin 60. The trailer frame 44 is secured to the pivoting tube 54. The side plates 56, pivoting tube 54 and pivot pin 60 allow the trailer 16 to pivot into the deployed and retracted position.

The locking mechanism of the present invention may include the following. A stopper 62 is secured within the side plates 56. The stopper 62 may include a vertical portion and a horizontal portion. The side plates 56 may further include first aligning apertures 63 and second aligning apertures 64. In the retracted position, a pin 58 is disposed within the first aligning apertures 63 and the pivoting tube 54 is secured in between the vertical portion and the pin 58. To transform the trailer 16 to the deployed position, the pin 58 is removed and the pivoting tube 54 is pivoted until the pivoting tube 54 rests against the horizontal portion. To lock the trailer 16 in the horizontal portion, the pin 58 is inserted into the second aligning apertures 64 and the pivoting tube 54 is secured in between the horizontal portion and the pin 58.

It should be understood, of course, that the foregoing relates to exemplary embodiments of the invention and that modifications may be made without departing from the spirit and scope of the invention as set forth in the following claims.

What is claimed is:

1. An all-terrain vehicle (ATV) trailer comprising:
an ATV mount comprising horizontal mounts operable to secure to a rack of an ATV and vertical mounts attached to and extending downward from the horizontal mounts;
a trailer frame comprising a platform, wherein the trailer frame is pivotally secured to the ATV mount;
at least one wheel secured to a bottom surface of the trailer frame; and
a locking mechanism operable to lock the trailer frame in a retracted position and a deployed position, wherein
the retracted position comprises the trailer frame substantially vertical and pivoted towards the ATV and the deployed position comprises the trailer frame substantially horizontal and pivoted away from the ATV.

2. The ATV trailer of claim 1, wherein the at least one wheel is pivotally secured to a central portion of the bottom surface, wherein the wheel pivots about a vertical axis when in the deployed position.

3. The ATV trailer of claim 2, further comprising a wheel lock operable to lock the wheel and prevent the wheel from pivoting about the vertical axis.

4. The ATV trailer of claim 2, wherein the at least one wheel is mounted to the bottom surface by legs comprising an adjustable length.

5. The ATV trailer of claim 1, further comprising latches secured to top ends of the vertical mounts, wherein the latches fit and secure within latch receivers formed through the platform in the retracted position.

6. The ATV trailer of claim 1, wherein the horizontal mounts are adjustable in length.

7. The ATV trailer of claim 1, wherein the ATV mount comprising a mount tube operable to releasably secure within a trailer receiver of the ATV.

8. The ATV trailer of claim 7, further comprising:
side plates secured to a distal end of the mount tube; and
a pivoting tube secured to the trailer frame and pivotally attached within the side plates.

9. The ATV trailer of claim 8, wherein the locking mechanism comprises:
a stopper secured in between the side plates and comprising a vertical portion and a horizontal portion;
first aligning apertures formed through the side plates;
second aligning apertures formed through the side plates; and
a locking pin, wherein
the retracted position comprises the locking pin disposed within the first aligning apertures and the pivoting tube disposed in between the locking pin and the horizontal portion; and
the deployed position comprises the locking pin disposed within the second aligning apertures and the pivoting tube disposed in between the locking pin and the vertical portion.

* * * * *